United States Patent [19]

Carpenter et al.

[11] 4,431,954
[45] Feb. 14, 1984

[54] MOTOR VEHICLE WINDSHIELD WIPER APPARATUS WITH STORM PATTERN

[75] Inventors: Keith H. Carpenter, Kettering; Donald E. Graham, Centerville; James J. Kowalik, West Carrollton, all of Ohio

[73] Assignee: General Motors Corporation, Detroit, Mich.

[21] Appl. No.: 444,798

[22] Filed: Nov. 26, 1982

[51] Int. Cl.³ .............................................. H02P 1/04
[52] U.S. Cl. ..................................... 318/443; 318/446; 318/466; 318/266; 310/83; 310/112; 15/250.13; 15/250.16
[58] Field of Search ................... 318/9, 281, 282, 283, 318/284, 285, 286, 443, 266, 466; 15/250.12, 250.13, 250.27, 250.30, 250.14, 250.16, 250.17; 310/83, 112

[56] References Cited

U.S. PATENT DOCUMENTS

| | | | |
|---|---|---|---|
| 2,258,010 | 10/1941 | Horton et al. | 15/255 |
| 2,691,186 | 10/1954 | Oishei et al. | 15/253 |
| 2,691,789 | 10/1954 | Horton | 15/250.14 |
| 2,825,919 | 3/1958 | Horton | 15/253 |
| 2,948,010 | 8/1960 | Oishei et al. | 15/250.27 |
| 3,025,553 | 3/1962 | Fox et al. | 15/250.16 |
| 3,049,742 | 8/1962 | Kato et al. | 15/250.17 |
| 3,226,755 | 1/1966 | Fox et al. | 15/250.16 X |
| 3,336,619 | 8/1967 | Hoyler | 15/250.14 |
| 3,675,103 | 7/1972 | Elliot | 318/281 |
| 3,829,924 | 8/1974 | Dittrich et al. | 15/250.14 |

Primary Examiner—J. V. Truhe
Assistant Examiner—Paul Shik Luen
Attorney, Agent, or Firm—Robert M. Sigler

[57] ABSTRACT

Windshield wiper apparatus for a motor vehicle includes a first wiper pivoted below the driver side of the windshield and capable of wiping an arc between the bottom center and the driver side end thereof, a second wiper pivoted to the passenger side of the pivot of the first and capable of wiping an arc between the bottoms of the driver and passenger sides thereof, said arcs having a substantial portion of overlap on the driver side, first and second motors effective to drive the first and second wipers at substantially similar speeds and control apparatus having a mode of operation in which it is effective to drive the wipers in tandem from the bottom of the windshield to the end of the arc of the first wiper at the driver end of the windshield, hold the first wiper in that position while driving the second wiper to the bottom of the driver side and back and then drive both wipers in tandem back to the starting point. Thus the overlapping portion of the arcs receives additional wipes and is positively cleared on each wipe.

5 Claims, 7 Drawing Figures

MOTOR VEHICLE WINDSHIELD WIPER APPARATUS WITH STORM PATTERN

BACKGROUND OF THE INVENTION

This invention relates to windshield wiper apparatus for a motor vehicle which has selectable, plural modes of operation for different weather conditions. In particular, it relates to such apparatus which has a normal mode of operation for light to medium rain or snow and a separate selectable "storm" mode for heavy rain or snow which provides distinct advantages in visibility during such storm conditions.

Figure 1:
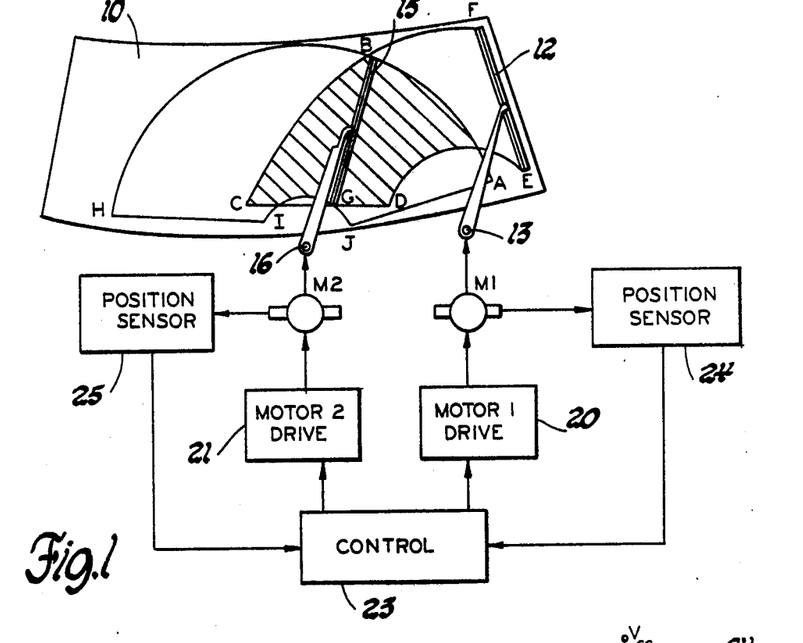
FIG. 1 shows windshield wiper apparatus according to this invention.

Typical windshield wiper apparatus provided with today's motor vehicles includes a pair of wipers which sweep across a windshield in tandem with the driver's side blade pivoted at a point below the driver's side of the windshield and the passenger side wiper pivoted at a point to the passenger side of the pivot of the driver side blade. Referring to FIG. 1, the passenger side blade generally sweeps the area GBHI; while the driver side blade sweeps the area EFCD. Normally, two speeds of wiper operation are provided for different weather conditions; but there is no change in the wiper pattern. This arrangement has proven sufficiently successful to be the standard windshield wiper arrangement for small passenger vehicles and works well in almost all weather conditions.

However, most drivers of motor vehicles have occasionally experienced precipitation which collects on the windshield so fast and in such quantity that visibility is greatly diminished even at the high speed of wiper operation and the driver must slow his vehicle greatly or even pull off to the side of the road. The driver may, however, prefer to continue and he would thus welcome a special "storm" mode of operation which he could immediately select to provide improved performance in heavy precipitation.

With respect to the normal wiper operating modes, there appear to be two limitations which are not important in light or medium precipitation but which assume increasing importance as the precipitation becomes heavier. The first is that the blades are designed to clean as great an area of the windshield as possible. They continue to sweep the same area even as their speed is increased in response to heavier precipitation. However, when precipitation becomes so heavy that they cannot keep up with it at high speed, it might be desirable to assign a higher priority to a smaller area of the windshield directly in front of the vehicle operator and increase the cleaning rate in that area of the windshield at the expense of another part of the windshield, particularly the passenger's side. The other factor is that, in the normal mode of operation, the passenger side blade reaches its maximum outer position BG as shown in FIG. 1 and leaves its accumulated residue from the windshield in a line in front of the driver until the driver's biade sweeps the residue to the bottom of the windshield on its reverse wipe. When precipitation is heavy, it would be desirable to positively sweep it out of the driver's main field of vision on each wipe.

SUMMARY OF THE INVENTION

Therefore it is an object of this invention to provide windshield wiper apparatus for a motor vehicle having a mode of operation designed especially for storms and heavy precipitation.

It is a further object of this invention to provide such a windshield wiper apparatus which is capable, during a storm or heavy precipitation, of effectively cleaning a reduced area directly in the driver's field of vision while maintaining at least some cleaning of the remainder of the normally cleaned area of the windshield.

It is yet another object of this invention to provide such a windshield wiper apparatus which positively sweeps precipitation out of the driver's field of vision on each wipe.

These objects and others are obtained with a windshield wiper apparatus for a motor vehicle having a pair of wiper blades which are moved in tandem from positions at the bottom of the windshield across passenger and driver sides, respectively, until the driver side blade reaches an outer limiting position. The passenger side blade, however, continues to sweep down to near the bottom of the windshield on the driver side and back up again while the driver side blade remains stationary in the upper limiting position. Finally, the blades are swept in tandem back across their own respective areas of the windshield to the initial positions.

In this manner, a substantial area within the driver's immediate field of vision is given double the number of wipes per cycle and, in addition, is positively cleaned of precipitation residue on each wipe of each wiper; so that driver visibility is improved. Further details and advantages of this invention will be seen in the accompanying drawings and following description of a preferred embodiment.

DESCRIPTION OF A PREFERRED EMBODIMENT

The preferred embodiment is shown in FIG. 1. A motor vehicle windshield 10 includes a driver's side blade 12 pivoted at point 13 below the driver's side of windshield 10 and a passenger side blade 15 pivoted at point 16 below the approximate center of windshield 10. Driver side blade 12 is powered by a motor M1, a reversible DC motor which receives electric power for actuation selectably in one direction or the other from a motor 1 drive 20. Passenger side blade 15 is driven by a similar reversible motor M2, which is powered by a motor 2 drive 21. A control 23 controls the actuation of motor 1 drive 20 and motor 2 drive 21. An angular position sensor 24 is effective to follow the position of the output shaft of motor M1 and provide an analog voltage output signal to control 23. Similarly, an angular position sensor 25 follows the position of the output shaft of motor M2 and provides an analog voltage signal thereof to control 23. Potentiometers connected across a stable voltage supply are satisfactory embodiments for position sensors 24 and 25.

The windshield apparatus of FIG. 1 will be described as having three modes of operation: off; normal mode; and storm mode. In actual practice, the apparatus would have several additional modes of operation, since the normal mode would actually have high and low speeds, a washer which required some wiper operation would be included and there might be a delay or pulse mode. However, such other modes of operation are not essential to the description of this invention and would needlessly complicate the specification. Therefore, they are not shown; however, it would be obvious to one skilled in the art that they could be included in the system and, in addition, how the system would appear with them included.

In the normal mode of operation, blades 12 and 15 move in tandem and substantially in a parallel orientation, with blade 15 sweeping the area GBHI and blade 12 sweeping the area EFCD. The inner positions for the blades are HI for blade 15 and CD for blade 12; whereas the outer positions are BG for blade 15 and EF for blade 12, as shown in FIG. 1. In the storm mode, blade 12 sweeps the same area as in the normal mode of operation; but blade 15 continues past outer position BG to the storm position JA. While blade 15 is moving from position BG to position JA and back, blade 12 remains in position EF. During the storm mode of operation, the shaded area of the windshield 10, which is directly in front of the driver's side field of vision, receives twice the frequency of wipes as that of the remainder of the windshield, since it is wiped by both blades in both directions on each cycle. If motors M1 and M2 tend to always drive blades at a substantially constant speed, the storm mode of operation will provide a somewhat lower wipe frequency for the unshaded area of the windshield which is only wiped by one of the blades, since blade 15 has farther to move on each cycle. However, since the shaded area receives double the frequency of wipes, it will be wiped with substantially greater frequency than it would be in the normal mode of operation. If the storm mode is a variation on the high speed of motor operation, the shaded area will thus be effectively cleaned at a frequency or speed substantially greater than the normal high speed of windshield wiper operation. In addition, the shaded area is always being wiped by a blade, whether blade 12 or blade 15, which is moving completely across it so that no residue is ever left within that area for the other blade to pick up. Thus the cleaning of this area of the windshield is positive on each wipe at a faster rate than normal operation for improved visibility within a critical viewing area during storm or other heavy precipitation.

Figure 2:
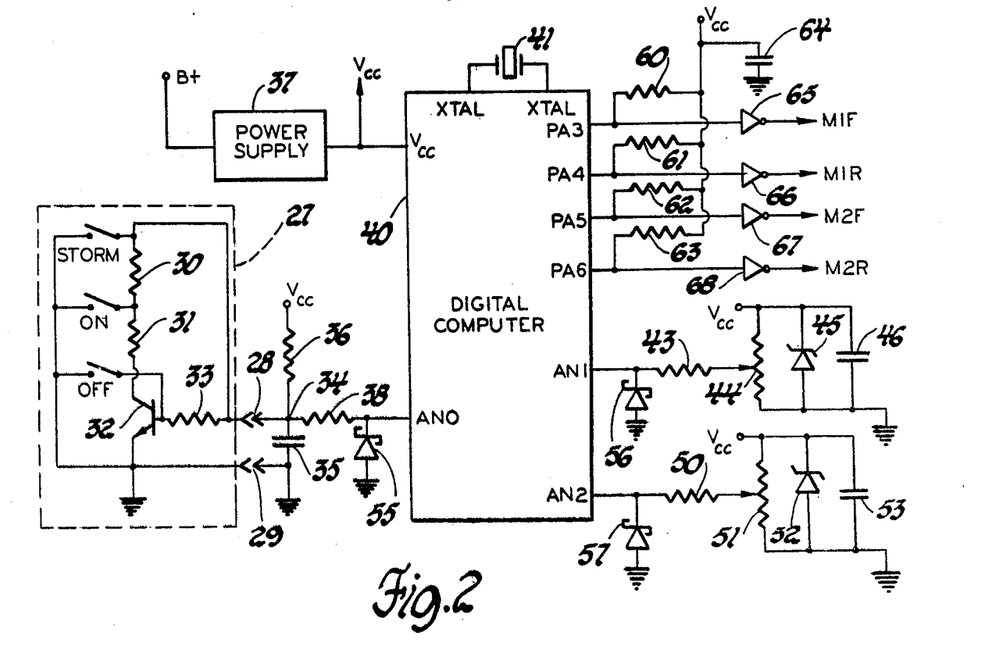
FIG. 2 shows a preferred embodiment for the control shown in the apparatus of FIG. 1.

Control 23 of FIG. 1 is shown in more detail in FIG. 2. The vehicle operator is provided with three push button or touch switches, which may be labeled STORM, ON and OFF. These switches are included in a dash unit 27 located within easy vision and access of the vehicle operator and connected through the engine fire wall to additional apparatus by means of wires 28 and 29. Each of the switches has one terminal grounded through wire 29; and the STORM switch has its other terminal connected to wire 28 and also through a resistor 30 to the other terminal of the ON switch. This other terminal of the ON switch is further connected through a resistor 31 to the collector of an NPN transistor 32 having an emitter grounded through wire 29. The base of transistor 32 is connected through a resistor 33 to wire 28 and also directly to the other terminal of the OFF switch.

Wires 28 and 29 are connected by a capacitor 35; and wire 28 is connected through a resistor 36 to a source of voltage $V_{cc}$ obtained from a power supply 37 and further through a resistor 38 to one analog input, AN0, of a digital computer 40.

Digital computer 40 may be a self-contained, one chip computer including analog inputs AN0, AN1, and AN2 and digital outputs PA3, PA4, PA5 and PA6. An example is the Motorola (R) 6805 computer, the only inputs and outputs of which being shown in FIG. 2 are those necessary for the description of this invention. Computer 40 receives electrical power from power supply 37 at an input labeled $V_{cc}$ and is provided with connections labeled XTAL to a four megahertz crystal 41 for regulation of the internal clock signals. Power supply 37 regulates voltage from the vehicle battery and alternator power source B+ to a regulated 6.3 volts and may be, for example, an MC7805BT power supply made by Motorola (R).

Analog input AN1 of computer 40 is connected through a resistor 43 to the wiper of a potentiometer 44 connected between power supply $V_{cc}$ and ground and having a parallel zener diode 45 and capacitor 46. Elements 44, 45 and 46 comprise the position sensor 24 associated with motor M1 and thus provide an analog voltage signal of the position of blade 12 to input AN1 of computer 40. Similarly, analog input AN2 of computer 40 is connected through a resistor 50 to the wiper of a potentiometer 51 connected between power supply $V_{cc}$ and ground and having a parallel zener diode 52 and capacitor 53. These elements comprise position sensor 25 which sends an analog signal of the position of blade 15 to analog input AN2 of computer 40. Analog inputs AN0, AN1 and AN2 are protected by Schottky rectifiers 55, 56 and 57 connecting the respective lines to ground.

Digital outputs PA3, PA4, PA5 and PA6 are connected through resistors 60, 61, 62 and 63, respectively, to power supply $V_{cc}$, which is also connected to ground through a capacitor 64. These outputs are further connected, respectively, to inverters 65, 66, 67 and 68, the outputs of which are labeled, respectively, M1F, M1R, M2F and M2R. These latter signals, as well as the outputs PA3-PA6 themselves, comprise the output signals to control motor 1 drive 20 and motor 2 drive 21.

Figure 3:
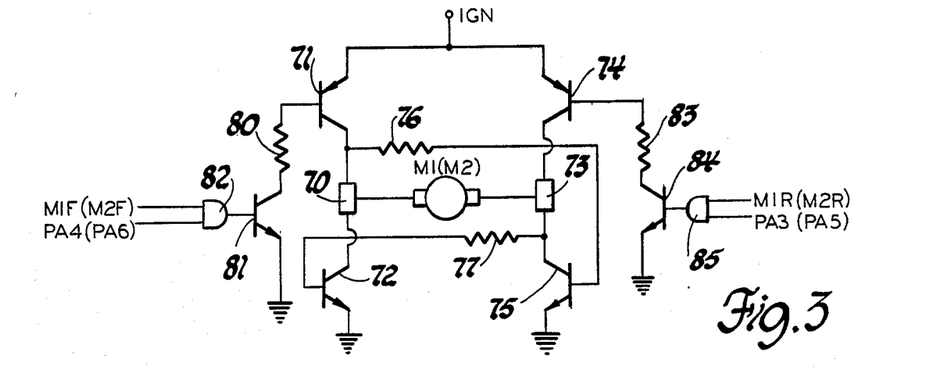
FIG. 3 shows a preferred embodiment for the motor drives shown in the apparatus of FIG. 1.
Figure 4:
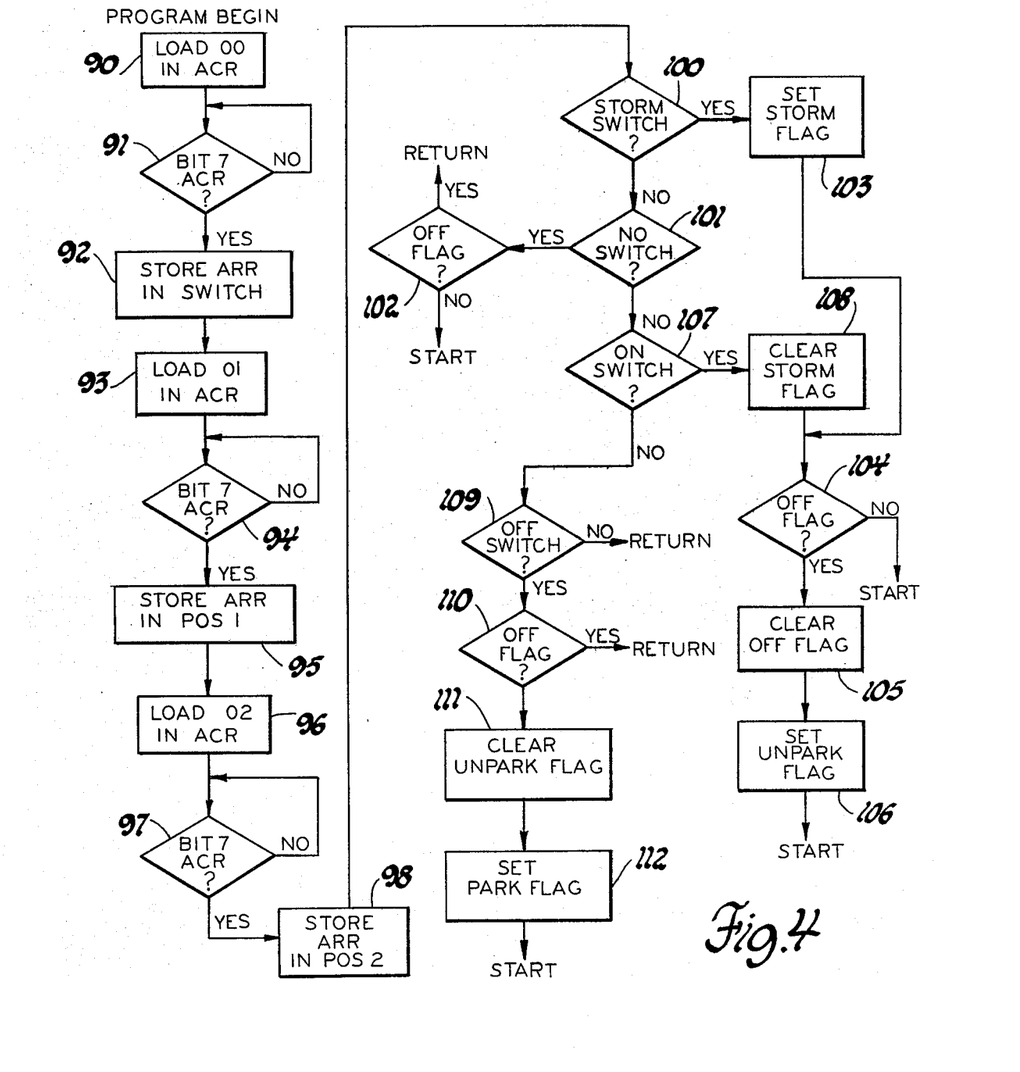
FIGS. 4–7 show flow charts describing the programming and operation of the apparatus of FIG. 1.

A motor drive circuit representing either motor 1 drive 20 or motor 2 drive 21 is shown in FIG. 3. A motor M1 (M2) has one armature terminal connected through a heat sink 70 to the collector of a PNP transistor 71 and the collector of an NPN transistor 72 having a grounded emitter. The other armature terminal of motor M1 (M2) is connected through a heat sink 73 to the collector of a PNP transistor 74 and also to the collector of an NPN transistor 75 having a grounded emitter. The emitters of PNP transistors 71 and 74 are both connected through the ignition terminal IGN to the vehicle battery B+. The base of transistor 75 is connected through a resistor 76 to the collector of transistor 71; while the base of transistor 72 is connected through a resistor 77 to the collector of transistor 75. Motor M1 (M2) is thus connected in an "H" switch configuration with PNP transistors 71 and 74 being the control transistors. If transistor 71 is turned on and transistor 74 turned off, for example, transistor 71 turns on transistor 75 through resistor 76; and this causes transistor 72 to be turned off through resistor 77 so that armature current flows through transistor 71, heat sink 70 motor M1 (M2), heat sink 73 and transistor 75. If transistor 71 is turned off and transistor 74 turned on, transistor 75 is thus turned off and transistor 72 turned on to provide armature current flowing in the opposite direction through motor M1 (M2) to drive the motor in the opposite direction. If both transistors 71 and 74 are turned off, the armature current is shut off to stop motor M1 (M2). Logic elements to be described below are provided to assure that transistors 71 and 74 are never turned on simultaneously.

The base of transistor 71 is connected through a resistor 80 to the collector of an NPN transistor 81 having a grounded emitter. An AND gate 82 has an output connected to the base of transistor 81 and a first input connected to M1F (M2F) and a second input connected to PA4 (PA6). The connections not in parentheses are for the case of motor M1; while the connections in parentheses are for the case of motor M2. Similarly, the base of transistor 74 is connected through a resistor 83 to the collector of an NPN transistor 84 having a grounded emitter. An AND gate 85 has an output connected to the base of transistor 84 and a first input connected to M1R (M2R) and a second input connected to PA3 (PA5). AND gates 82 and 85, connected to the digital output signals from computer 40 control transistors 71 and 74 to provide the desired armature current to motors M1 or M2. Although only one circuit is shown in FIG. 3; an identical circuit is provided for each motor, as shown in FIG. 1.

With regard to the control of computer 40, an internally programmable cycle clock is set or programmed to provide the initiation of a new program cycle every 500 microseconds. During each program cycle the analog inputs are read and their digital equivalents stored in designated memory locations. Analog input AN0 receives an analog input which varies in voltage level depending on the condition of the STORM, ON and OFF switches. The resistances of resistors 30, 31, 33 and 36 may be, for example, three, nine, 200 and six ohms, respectively. If the STORM switch is closed, wire 28 is grounded through the STORM switch so that analog input AN0 sees approximately ground voltage at the junction 34 of resistor 36 and capacitor 35. If the ON switch is closed, the six ohm resistor 36 is placed in series with the three ohm resistor 30 so that analog input AN0 sees approximately one-third $V_{cc}$ at junction 34. If no switch is closed, transistor 32 is turned on and resistors 36, 30 and 31 are connected in series across voltage $V_{cc}$ for a voltage of approximately two-thirds $V_{cc}$ at junction 34. Finally, if the OFF switch is closed, resistor 36 is placed in series with the 200 ohm resistor 33 to produce a voltage of substantially $V_{cc}$ at junction 34. Digital computer 40 includes analog to digital conversion means which convert the input analog voltage to a digital value between 0 and 255; and a software program which compares the converted input with predefined digital ranges is effective to identify which or if any switch is closed. Similarly, each of the analog voltage inputs from potentiometers 44 and 51 are converted to digital values between 0 and 255, with numbers increasing toward the right or outer positions in FIG. 1, after being received at analog inputs AN1 and AN2. Thus computer 40 has available to it at any time, in predefined RAM memory locations, the condition of the driver actuated switches and the position of the driver's side blade 12 and passenger side blade 15.

The operation of the system will be described with reference to the flow charts shown in FIGS. 4–7. It should be mentioned first that the system as described makes use of a synchronous overlap park for the two blades. This means that, although the blades move in tandem across the windshield, they are parked with the passenger side blade 15 directly below the driver side blade 12. Thus, for the blades to be unparked, driver side blade 12 must first rise from its park position below CD in FIG. 1 to its outer position EF and passenger side blade 15 must then rise from its park position below JA in FIG. 1 to position BG as shown in FIG. 1 before the normal tandem wipe may commence. Similarly, for the blades to be parked, driver side blade 12 must be stalled in its outer position EF while passenger side blade 15 is swept down to its park position; and only then can driver side blade 12 be brought down to its park position. The reason for such a parking arrangement is to save underhood space in a recessed park wiper system, since the recess need only be constructed on the driver's side of the car rather than extending the full width of the front windshield as is typical in today's vehicles. This provides greater room on the passenger side of the engine compartment for air conditioning and other equipment and allows a smaller engine compartment to assist in the quest for greater fuel economy.

The operation of the system is generally described in terms of several different operational modes. The off mode is the mode in which the system is not operating and the blades are parked. The normal or on mode is the mode in which the blades have already been unparked and are wiping in tandem across the windshield. The storm mode is the mode in which the blades are already unparked and are wiping the windshield in the storm pattern. The park mode is the mode in which the blades are moving to the park position; while the unpark mode is the opposite. These modes are controlled by a number of flags internal to the computer 40: the OFF, STORM, PARK, UNPARK, M1DOWN and FORWARD flags. The OFF, STORM, PARK and UNPARK flags, when set, indicate the desire of the system to be in the mode of the same name. The M1DOWN flag is set during the park mode when passenger side blade 15 has reached park position and it is safe for driver side blade 12 to descend. The FORWARD flag is used during normal or storm mode operation to determine the direction of blade movement across the windshield.

When the ignition switch of the motor vehicle is closed, power is supplied to computer 40 through power supply 37; and computer operation begins with a reset of all flags except the off flag, which is set, and a clearing of registers. The beginning of the program is described in FIG. 4. In the following description the numbers in parentheses are the reference numerals referring to steps in the flow chart as shown in the Figures. First, the number 00 is loaded (90) into the analog control register, or ACR. Bit 7 of the ACR is repeatedly checked (91) until it indicates that the A-D conversion for input AN0 is completed, at which point the contents of the analog result register or ARR, are stored (92) in a memory location known as SWITCH. A similar procedure is repeated with the number 01 loaded (93) in the ACR, bit 7 of the ACR checked (94) and the contents of the ARR from analog input AN1 stored (95) in a memory location known as POS1. Next, the ACR is loaded (96) with number 02, bit 7 of the ACR is checked (97) and the contents of the ARR, from analog input AN2, are stored (98) in a memory location known as POS2.

The preceding results in the reading, conversion to binary digital equivalents and storage of the input voltages corresponding to the switch condition and the positions of wiper blades 12 and 15. The maximum time for the accomplishment of this procedure is approximately 90 microseconds out of the total 500 microseconds before the next program cycle starts.

The program next proceeds to check the value of memory location SWITCH against a plurality of stored constants to determine whether a switch is closed and, if so, which one. The program first checks (100) for the closure of the STORM switch which, presumably, will not be closed as the ignition is first activated. The program next checks (101) for no switch being closed and, if so, checks (102) the OFF flag. Under the conditions stated, no switch would be closed and the OFF flag would be set, so the program would return to PROGRAM BEGIN an await the start of the next cycle. If the OFF flag had been reset, the program would have proceeded to the section of the program named START in FIG. 5.

Figure 5:
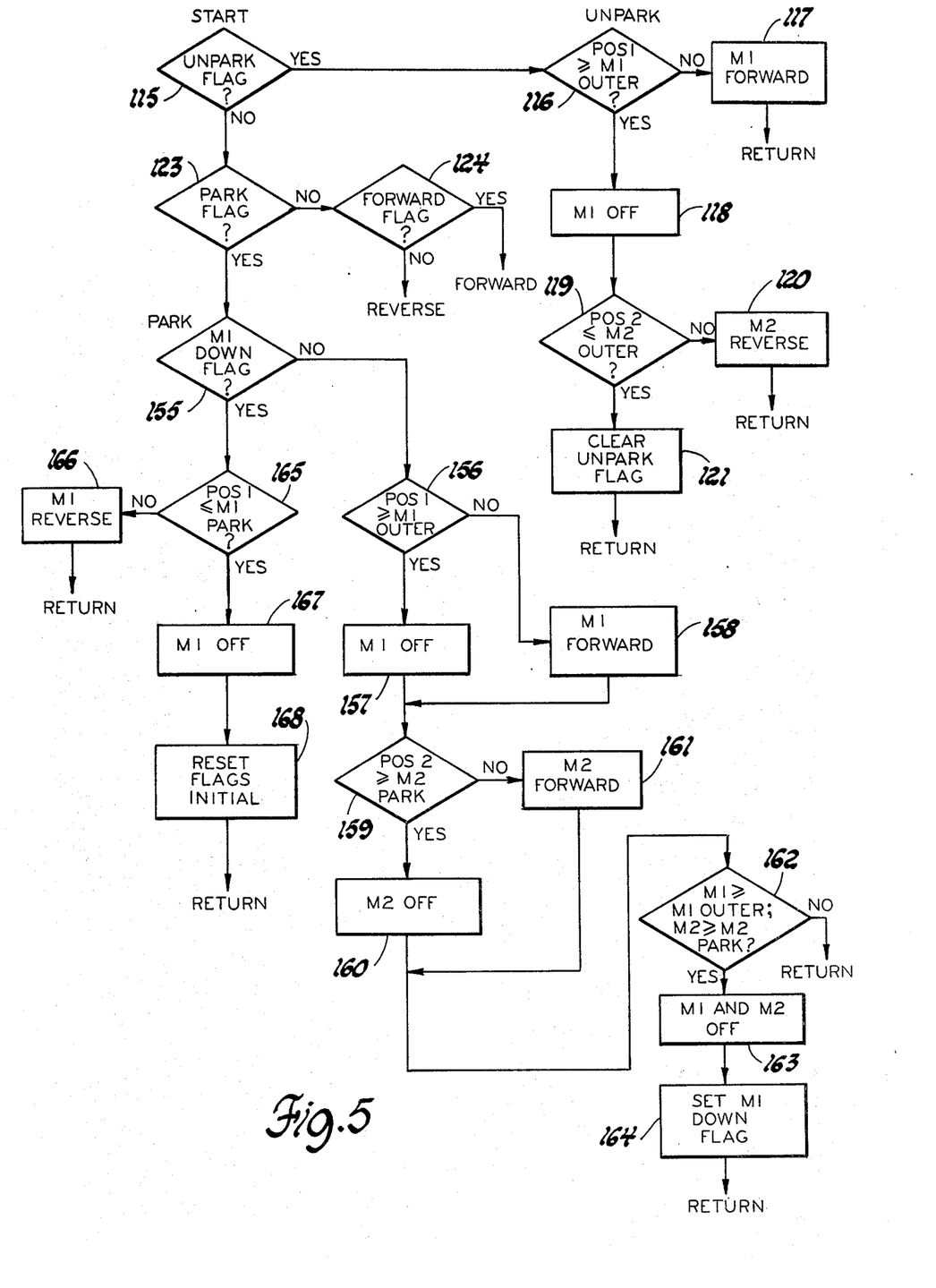

When the vehicle operator finally closes an actuating switch, for example the STORM switch, the program will proceed from decision point 100 to set (103) the STORM flag and then check (104) the OFF flag. If the OFF flag is reset the program proceeds to START; but if the OFF flag is set, the program clears (105) the OFF flag, then sets (106) the UNPARK flag before proceeding to START. If the switch closed had been the ON switch, the program would have proceeded to decision point 101 to check (102) the ON switch. With an affirmative ON switch result, the program would next clear (108) the STORM flag before proceeding to decision point 104 and checking the OFF flag.

If the OFF switch is pressed, the program proceeds from step 90 through decision points 100, 101 and 107 with a no respnse on each to check (109) the condition of the OFF switch. Actually, this check is not really necessary in the system as described since there are no other possible switch possibilities. However, if the switching arrangement included additional switches for wash, delay or other modes of operation, this check would allow a return from this portion of the program if the OFF switch were not the switch closed. If the OFF switch is determined to be closed, the program checks (110) the OFF flag and, if set, the program returns to await the start of the next cycle. If the OFF flag is not set, the program clears (111) the UNPARK flag and sets (112) the PARK flag before proceeding to START.

It can be seen that the normal procedure through this portion of the program is to read the analog inputs, store the digital equivalents in specified memory locations and, if no switches are currently being pushed, to check the OFF flag to determine whether the system is in operation. If the system is in operation, it proceeds to START in FIG. 5. If a switch is currently being closed, which indicates a probable change in the desired operating mode, a flag is adjusted to denote the desired mode of operation before the program proceeds to START.

Referring to FIG. 5, assume that the windshield wiper operation has just been started by the actuation of the ON switch and the blades are currently parked. The UNPARK flag is set and all other flags are reset. Beginning at START, the program checks (115) the UNPARK flag and, since it is set, proceeds to check (116) the value of POS1 against a stored constant M1OUTER, which represents the value of POS1 corresponding to the outer position EF of driver side blade 12 as shown in FIG. 1. If POS1 is not greater than or equal to M1OUTER, as it is not in this case, the program calls (117) for M1FORWARD by setting PA3 high and PA4 low and then returns to await the start of the next cycle. Thus M1 begins to drive driver's side blade 12 from its park position M1PARK, below CD, in a clockwise direction toward the outer position EF in FIG. 1.

Operation in this mode continues until POS1 is greater than or equal to M1OUTER, at which point the program calls (118) for M1OFF by setting outputs PA3 and PA4 low and then checks (119) POS2 against a stored constant M2OUTER, which represents the position GB of passenger side blade 15 in FIG. 1. If POS2 is not less than or equal to M2OUTER as it is not in this case, the program calls (120) for M2 reverse by setting a PA6 high and PA5 low and then returns to await the start of the next program cycle. Motor M2 drives passenger side blade 15 in the reverse direction, counterclockwise in FIG. 1, until both blades are in the position shown in FIG. 1. At this point POS2 becomes less than or equal to M2OUTER and the program clears (121) the UNPARK flag and returns to the start of the program. The unpark mode of operation is now complete with M1 off, M2 driving passenger blade 15 in the reverse direction and all flags, including especially the FORWARD flag, reset.

On the next cycle of the program, the UNPARK flag is found (115) to be reset and the program then checks (123) the PARK flag. Since the PARK flag is reset, the program then checks (124) the FORWARD flag. If the FORWARD flag is set, the program would proceed to another portion of the program, in FIG. 7, labeled FORWARD. However, since the FORWARD flag is reset, the program proceeds to a portion of the program, in FIG. 6, labeled REVERSE.

Figure 6:
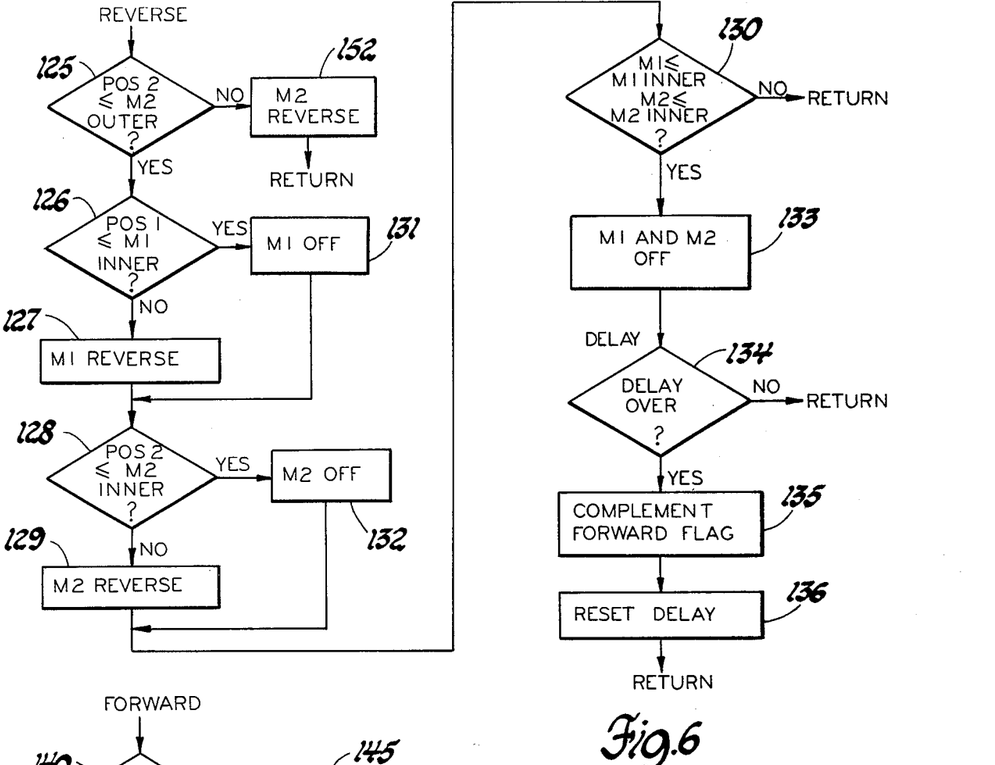

Referring to FIG. 6, the program first checks (125) for POS2 less than or equal to M2OUTER. Since this is always true in the normal mode of operation, the program next checks (126) to see if POS1 is less than or equal to M1INNER, which is a stored constant indicating the position CD of driver side blade 12 in FIG. 1. If not, the program calls (127) for M1REVERSE by setting PA4 high and PA3 low and then checks (128) for POS2 less than or equal to M2INNER, which is a stored constant indicating the position IH of passenger side blade 15. If this is not so, the program calls (129) for M2REVERSE by setting PA6 high and PA5 low. The program then, as an additional check again checks (130) for M1 less than or equal to M1INNER and M2 less than or equal to M2INNER and, if they are not, returns to await the start of the next cycle.

In this manner, the blades will proceed in tandem across the windshield in the reverse or counterclockwise direction. As soon as POS1 becomes less than or equal to M1INNER at decision point 126, the program calls (131) for M1OFF by resetting PA3 and PA4 to low outputs. As soon as POS2 is less than or equal to M2INNER at decision point 128, the program calls (132) for M2OFF by resetting outputs PA5 and PA6 to low output. As soon as M1 equals M1INNER an M2 equals M2INNER, the program calls (133) for both M1 and M2 off by resetting all outputs PA3-PA6 low and enters a delay cycle in which a count is compared (134) with a stored constant DELAY on each cycle and counted down to zero. When the delay is over at decision point 134, the program complements (135) the FORWARD flag, resets (136) the delay counter and returns to await beginning of the next cycle. The delay is a short delay of approximately 40 milliseconds to insure smoother wiper operation and help protect the power transistors from overheating in the repeated motor reversals of normal operation. When the FORWARD flag is complemented, it is changed from its present condition, either set or reset, to the opposite condition. With the blades in positions M1INNER and M2INNER, the FORWARD flag is set.

Figure 7:
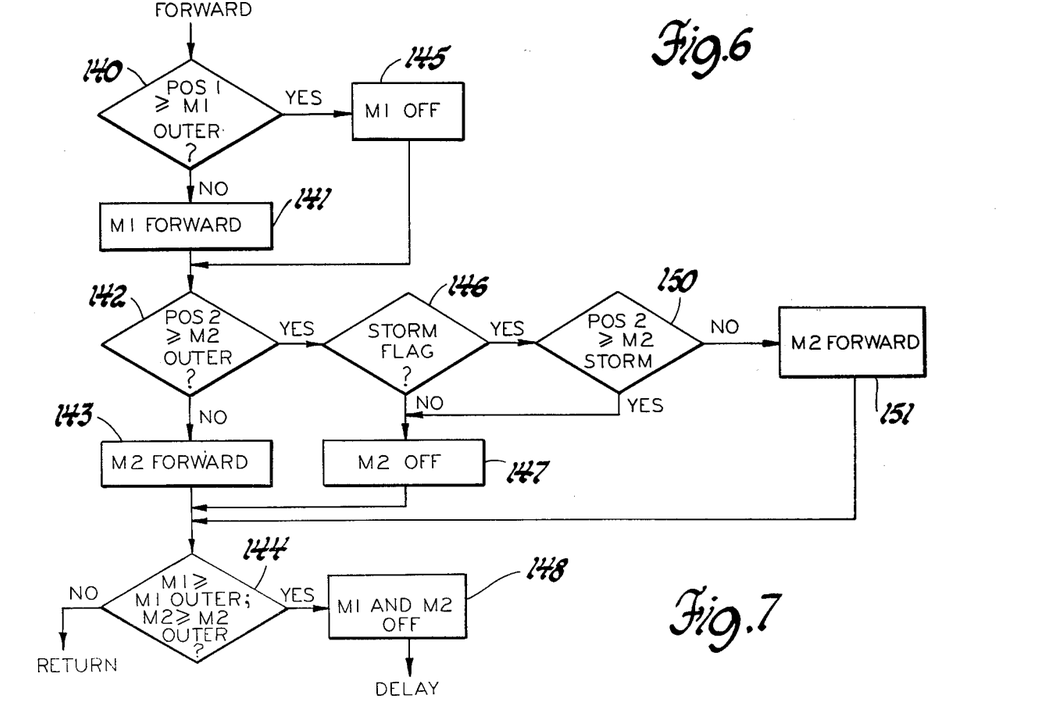

On the next cycle, the program will leave decision point 124 and proceed to the FORWARD portion of the program in FIG. 7. In this portion, the program first checks (140) to see if POS1 is greater than or equal to M1OUTER. If not, the program calls (141) for M1FORWARD by setting PA3 high and PA4 low. The program next checks (142) to see if POS2 is greater than or equal to M2OUTER and if not, calls (143) for M2FORWARD by setting PA5 high and PA6 low. The program next checks (144) once again to see if M1 is greater than or equal to M1OUTER and M2 is greater than or equal to M2OUTER and, if not, returns to the start of the program. M1 and M2 thus drive blades 12 and 15 in the forward or clockwise direction across windshield 10 toward the driver side thereof. When POS1 becomes greater than or equal to M1OUTER, the program proceeds from decision point 140 to call (145) for M1OFF by resetting PA3 and PA4 to low outputs. When POS2 becomes greater than or equal to M2OUTER, the program proceeds from decision point 142 to check (146) the STORM flag. If the STORM flag is not set, the program proceeds to call (147) for M2OFF by resetting PA5 and PA6 to low outputs. When M1 equals M1OUTER and M2 equals M2OUTER, the program proceeds from decision point 144 to call (148) for M1OFF and M2OFF by resetting all outputs PA3-PA6 low and then proceeds to the delay routine at decision point 134 of FIG. 6. In this manner, blades 12 and 15 are driven back and forth across the windshield in normal operation between their inner and outer positions.

This operation is modified slightly by the setting of the STORM flag. In the FORWARD portion of the program in FIG. 7, if the STORM flag is set, the program proceeds from decision point 146 to check (150) if POS2 is greater than or equal to M2STORM, which is a stored internal constant indicating the position JA of passenger side blade 15 in FIG. 1. If not, the program calls (151) for M2FORWARD by setting PA5 high and PA6 low and then proceeds to decision point 144. If not, the program proceeds to step 147 and turns off motor M2. Thus, in the FORWARD direction, the STORM flag extends the range of passenger side wiper 15 from position GB to position JA in FIG. 1 and holds driver side wiper blade 12 stalled in position EF while this is carried out. When the direction reverses, at first POS2 will not be less than or equal to M2OUTER at decision point 125 and the program will proceed to call (152) for M2REVERSE by setting PA6 high and PA5 low and returning to the start of the program, thus not activating driver side wiper blade 12 until passenger side blade 15 reaches position GB. This completes the description of the storm mode of operation.

When the park flag is set, the program will proceed from decision point 123 in FIG. 5 to check (155) the M1DOWN flag. If it is not set, the program will check (156) to see if POS1 is greater than or equal to M1OUTER. If so, in which case blade 12 is in position EF of FIG. 1, the program calls (157) for M1OFF by resetting outputs PA3 and PA4 low. If not, the program calls (158) for M1FORWARD by setting output PA3 high and PA4 low. If M1 is moving in the reverse direction at the time, this will result in an instant direction change; however, this will not be harmful to the transistors or motor in an occasional occurrence.

The program next checks (159) to see if POS2 is greater than or equal to M2PARK, which is a stored constant indicating a park position for passenger side blade 15 below position JA in FIG. 1. If so, the program calls (160) for M2OFF by resetting outputs PA5 and PA6 low. If not, the program calls (161) for M2FORWARD by setting PA5 high and PA6 low. Next the program rechecks (162) to see if M1 is greater than or equal to M1OUTER and M2 is greater than or equal to M2PARK and, if not, returns to the beginning of the program. When M1 equals M1OUTER and M2 equals M2PARK, the program calls (163) for M1 and M2 off by resetting PA3-PA6 low, sets (164) and M1DOWN flag and returns to the start of the program. When this occurs, passenger side blade 15 is in M2PARK position and driver side blade 12 is ready to descend.

On the next cycle, the program will proceed from decision point 155 in FIG. 5 to check (165) to see if POS1 is less than or equal to M1PARK. If not the program calls (166) for M1REVERSE by setting output PA4 high and PA3 low and returns to the start of the program. However, of POS1 is less than or equal to M1PARK, both blades are parked and the program calls (167) for M1OFF by resetting outputs PA3 and PA4 to low values resets (168) all flags to their initial values and returns to the start of the program. From this point until another switch is closed, the OFF flag is again set and the system remains parked.

It is clear that the system can be refined with a more complicated algorithm. For instance, instead of only defining the limit positions of the wiper blades, additional intermediate positions may be defined by the addition of predetermined stored internal constants and the program altered to check, during wiping operation, for the attainment of predetermined positions for one blade before allowing the other blade to proceed to other predetermined positions. If this is done, the additional benefit can be gained that provision can be made for the operation of the passenger blade 15 through the maximum permissible portion of its arc if the driver side blade 12 should stop. In addition, although synchronous overlap park is shown in the specification, there is no reason why the system could not be modified to a more conventional tandem park system. Further, if the blades are to be parked on the glass, it would be possible to simplify the system even further by eliminating the separate park position constants and using the inner extreme wipe positions for park sensing. Many variations on the system are possible and are easy to implement by changes in the program. Therefore, the scope of the invention should be limited only by the claims which follow.

It is clear that the location of the pivot of the passenger side blade, although described in the preferred embodiment as below the approximate center of the windshield, may be anywhere within a substantially broad range on either side of the center, depending on the specific windshield design and wiper performance criteria. Any such point is contemplated as long as it is to the passenger side of the pivot of the driver side blade and the storm mode wipe patterns HIJAB and CDEF, as defined in FIG. 1, have a substantial overlapping portion within the driver's field of vision.

The embodiments of the invention in which an exclusive property or privilege is claimed are defined as follows:

1. Wiper apparatus for a vehicle windshield having driver and passenger sides, comprising in combination:

a first wiper having a pivot below the driver side of the windshield;

a second wiper having a pivot to the passenger side of the pivot of the first wiper;

first and second electric motors effective, when actuated, to drive said first and second wipers, respectively, through arcs across said windshield;

means effective to control the actuation of said motors to generate repeated wipe cycles of said first and second wipers, each such cycle having a first phase in which said first and second wipers are driven in substantially parallel synchronization from positions adjacent the bottom of the windshield through arcs across the driver and passenger sides of the windshield, respectively, to positions in which the first wiper is adjacent the driver end of the windshield, a second phase in which the first wiper is deactivated and the second wiper is driven through a further arc across the driver side of the windshield to the bottom thereof and back and a third phase in which the first phase is reversed, whereby improved driver visibility results from the greater wipe frequency on the driver side and the positive cleaning thereof on each wipe.

2. Wiper apparatus for a vehicle windshield having driver and passenger sides, comprising in combination:

a first wiper having a pivot below the driver side of the windshield;

a second wiper having a pivot to the passenger side of the pivot of the first wiper;

first and second electric motors effective, when actuated, to drive said first wiper through an arc across said windshield from the bottom center thereof to the driver side end thereof and the second wiper through a longer arc across said windshield from the bottom of the passenger side to the bottom of the driver side thereof, said arcs having a substantial overlapping portion on the driver side of the windshield; and means effective to control the actuation of said motors to generate repeated wipe cycles of said first and second wipers moving substantially in tandem at substantially similar speeds, said means being further effective to stop said first wiper in each cycle at the driver side end of its arc while the second wiper wipes down and up through the overlapping portion of the arcs, whereby improved driver visibility results from the greater wipe frequency on the overlapping portion of the arcs and the positive cleaning thereof on each wipe.

3. Wiper apparatus for a vehicle windshield having driver and passenger sides, comprising in combination:

a first wiper having a pivot below the driver side of the windshield and being movable to sweep an arc across the windshield between an inner position at the bottom center thereof and an outer position at the driver side end thereof;

a second wiper having a pivot to the passenger side of the pivot of the first and being movable to sweep an arc across the windshield between an inner position at the bottom of the passenger side thereof and a storm position at the bottom of the driver side thereof, said arcs of the first and second wipers having a substantial portion of overlap on the driver side of the windshield;

first and second electric motors effective, when actuated, to drive said first and second wipers, respectively, at substantially similar speeds through said arcs;

first means effective to sense and signal the inner and outer positions of said first wiper and the inner and storm positions of said second wiper, said means being further effective to sense and signal a predetermined outer position of the second wiper intermediate said inner and storm positions and corresponding to said outer position of the first wiper in a tandem wipe mode of operation;

second means effective, upon sensing of the inner positions of both wipers, to activate the first and second motors to drive both wipers in tandem toward the driver side of the windshield;

third means effective, upon sensing of the outer position of the first wiper, to deactivate the first motor and thus stop the first wiper in said position;

fourth means effective, upon sensing of the storm position of the second wiper, to activate the second motor to drive the second wiper toward the passenger side of the windshield; and fifth means effective, upon sensing of the second wiper passing its outer position while moving toward the passenger side of the windshield, to activate the first motor to drive the first wiper in tandem with the second toward the passenger side, whereby improved driver visibility results from greater wipe frequency over the portion of overlapping arcs and the positive cleaning thereof on each wipe.

4. Wiper apparatus for a vehicle windshield having driver and passenger sides, comprising in combination:

a first wiper having a pivot below the driver side of the windshield;

a second wiper having a pivot to the passenger side of the pivot of the first wiper;

first and second electric motors effective, when actuated, to drive said first and second wipers, respectively, through arcs across said windshield;

means effective to control the actuation of said motors to generate repeated wipe cycles of said first and second wipers, each such cycle in a first mode of operation having a first phase in which said first and second wipers are driven in substantially parallel synchronization from positions adjacent the bottom of the windshield through arcs across the driver and passenger sides of the windshield, respectively, to positions in which the first wiper is adjacent the driver end of the windshield, and a final phase in which the first phase is reversed, each such cycle in a second mode of operation having an intermediate phase between said first and final phases in which the first wiper is deactivated and the second wiper driven through a further arc across the driver side of the windshield to the bottom thereof and back, whereby improved driver side visibility results from greater wipe frequency in a portion of the driver side and the positive cleaning thereof on each wipe; and means effective to select the first or second mode of operation.

5. Wiper apparatus for a vehicle windshield having driver and passenger sides, comprising in combination:

a first wiper having a pivot below the driver side of the windshield and being movable to sweep an arc across the windshield between an inner position at the bottom center thereof and an outer position at the driver side end thereof;

a second wiper having a pivot to the passenger side of the pivot of the first and being movable to sweep an arc across the windshield between an inner position at the bottom of the passenger side thereof and a storm position at the bottom of the driver side thereof, said arcs of the first and second wipers having a substantial portion of overlap on the driver side of the windshield;

first and second electric motors effective, when actuated, to drive said first and second wipers, respectively, at substantially similar speeds through said arcs;

first means effective to sense and signal the inner and outer positions of said first wiper and the inner and storm positions of said second wiper, said means being further effective to sense and signal a predetermined outer position of the second wiper intermediate said inner and storm positions and corresponding to said outer position of the first wiper in a tandem wipe mode of operation;

second means effective, upon sensing of the inner positions of both wipers, to activate the first and second motors to drive both wipers in tandem toward the driver side of the windshield;

third means effective, upon sensing of the outer position of the first wiper, to deactivate the first motor and thus stop the first wiper in said position;

fourth means effective, upon sensing of the storm position of the second wiper, to activate the second motor to drive the second wiper toward the passenger side of the windshield;

fifth means effective, upon sensing of the second wiper passing its outer position while moving toward the passenger side of the windshield, to activate the first motor to drive the first wiper in tandem with the second toward the passenger side;

sixth means effective, upon sensing the outer positions of the first and second wipers to activate the first and second motors to drive both wipers in tandem toward the passenger side of the windshield; and driver selection means actuable in a first mode to actuate the first, second and sixth means for tandem wiper operation and further actuable in a second mode to actuate the first, second, third, fourth and fifth means, whereby improved driver visibility results from greater wipe frequency over the portion of overlapping arcs and the positive cleaning thereof on each wipe.

* * * * *